US011530909B2

(12) United States Patent
Pang et al.

(10) Patent No.: US 11,530,909 B2
(45) Date of Patent: Dec. 20, 2022

(54) FIBER COMPOSITE AND PREPARING METHOD OF THE SAME

(71) Applicant: Research & Business Foundation Sungkyunkwan University, Suwon-si (KR)

(72) Inventors: Chang Hyun Pang, Pyeongtaek-si (KR); Gi Ra Yi, Suwon-si (KR); Ji Sun Kim, Daejeon (KR); Da Wan Kim, Suwon-si (KR); Si Yeon Jang, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 208 days.

(21) Appl. No.: 16/555,809

(22) Filed: Aug. 29, 2019

(65) Prior Publication Data

US 2020/0072596 A1 Mar. 5, 2020

(30) Foreign Application Priority Data

Sep. 3, 2018 (KR) .................. 10-2018-0104519
Aug. 14, 2019 (KR) .................. 10-2019-0099308

(51) Int. Cl.
*G01B 7/16* (2006.01)
*B32B 27/20* (2006.01)
*B32B 27/40* (2006.01)

(52) U.S. Cl.
CPC ............... *G01B 7/18* (2013.01); *B32B 27/20* (2013.01); *B32B 27/40* (2013.01);
(Continued)

(58) Field of Classification Search
CPC .......... G01B 7/18; B32B 27/20; B32B 27/40; B32B 2255/02; B32B 2307/732;
(Continued)

(56) References Cited

U.S. PATENT DOCUMENTS

2009/0233237 A1* 9/2009 Yoshiki .................. H05K 3/106
430/311
2009/0282671 A1 11/2009 Tao et al.
(Continued)

FOREIGN PATENT DOCUMENTS

KR  10-2016-0053759 A   5/2016
KR  10-2017-0106295 A   9/2017
(Continued)

OTHER PUBLICATIONS

Chen, Jing; et al., "Polydimethylsiloxane (PDMS)-Based Flexible Resistive Strain Sensors for Wearable Applications", Feb. 28, 2018, Applied Sciences, p. 2 (Year: 2018).*
(Continued)

*Primary Examiner* — Callie E Shosho
*Assistant Examiner* — Steven A Rice
(74) *Attorney, Agent, or Firm* — NSIP Law

(57) ABSTRACT

The present invention relates to a fiber composite for a strain sensor and a method for producing the same. The composite includes a stretchable fiber; a conductive elastic polymer layer coated on the stretchable fiber; polymer beads disposed on the stretchable fiber or on the elastic polymer layer; and a conductive elastic polymer layer covering the polymer beads. The fiber composite is durable and stable. Therefore, a strain sensor produced using the fiber composite exhibits excellent durability, recoverability, repeatability and sensitivity, and a fast sensing speed.

9 Claims, 17 Drawing Sheets

(52) U.S. Cl.
CPC ....... *B32B 2255/02* (2013.01); *B32B 2255/26* (2013.01); *B32B 2262/0292* (2013.01); *B32B 2264/0228* (2013.01); *B32B 2264/10* (2013.01); *B32B 2307/202* (2013.01); *B32B 2307/732* (2013.01)

(58) Field of Classification Search
CPC .... B32B 2262/0292; B32B 2264/0228; B32B 2264/10; B32B 2307/202; B32B 2255/26
USPC ........................................................ 428/327
See application file for complete search history.

(56) References Cited

U.S. PATENT DOCUMENTS

2016/0376747 A1* 12/2016 Wang ..................... D03D 15/00
428/335
2019/0364983 A1* 12/2019 Nakajima ............ A61B 5/6804

FOREIGN PATENT DOCUMENTS

| KR | 10-2017-0137043 A | 12/2017 | |
|---|---|---|---|
| KR | 10-1854778 B1 | 5/2018 | |
| WO | 2017/145940 A1 | 8/2017 | |
| WO | WO-2018123034 A1 * | 7/2018 | ............... G06F 3/01 |
| WO | WO-2018182532 A1 * | 10/2018 | ............... G01L 1/22 |

OTHER PUBLICATIONS

Jang, Siyeon; et al., "Carbon-Based, Ultraelastic, Hierarchically Coated Fiber Strain Sensors with Crack-Controllable Beads", Mar. 28, 2019, ACS Applied Materials & Interfaces, vol. 11, Issue 16, p. 15079-15080 and 15085 (Year: 2019).*

Li, Xiaoting; et al., "An ultraflexible polyurethane yarn-based wearable strain sensor with a polydimethylsiloxane infiltrated multilayer sheath for smart textiles", Jan. 7, 2020, Royal Society of Chemistry, Nanoscale vol. 20, p. 4110 (Year: 2020).*

Liu, Lihua; et al., "Preparation and Property Research of Strain Sensor Based on PDMS and Silver Nanomaterials", Mar. 9, 2017, Journal of Sensors, vol. 2017, p. 1 (Year: 2017).*

* cited by examiner

[FIG. 1]
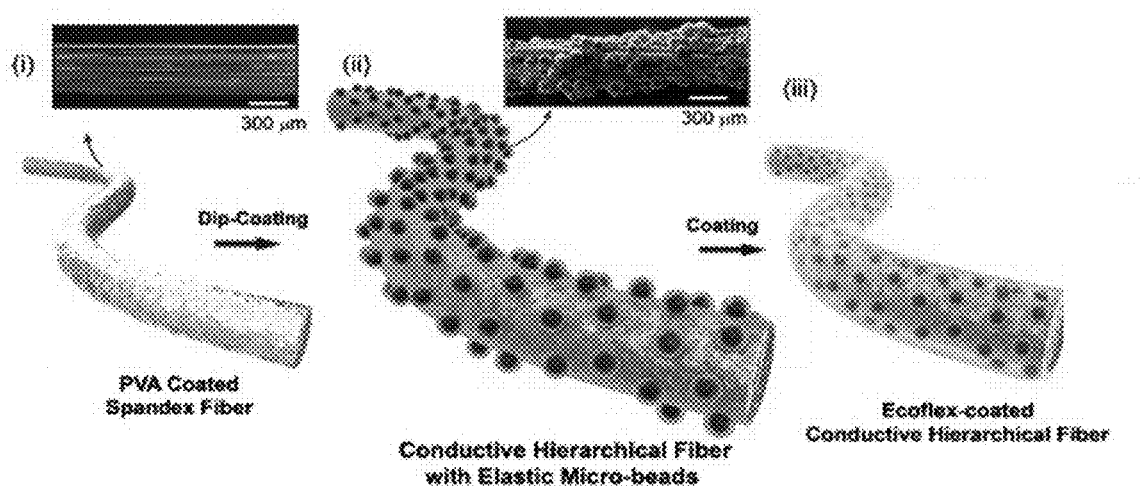
[FIG. 2]
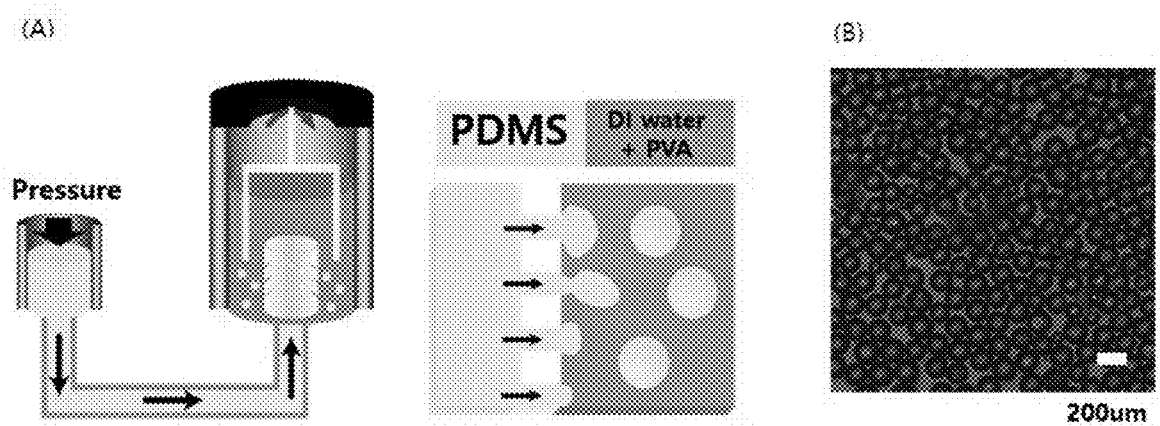

[FIG. 3]
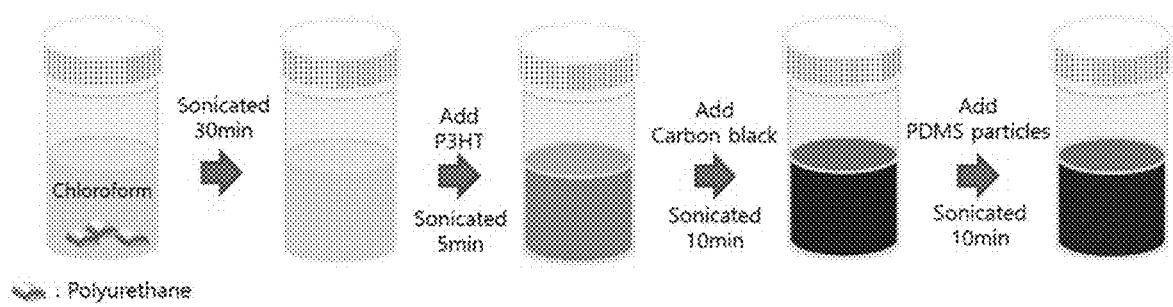
[FIG. 4]
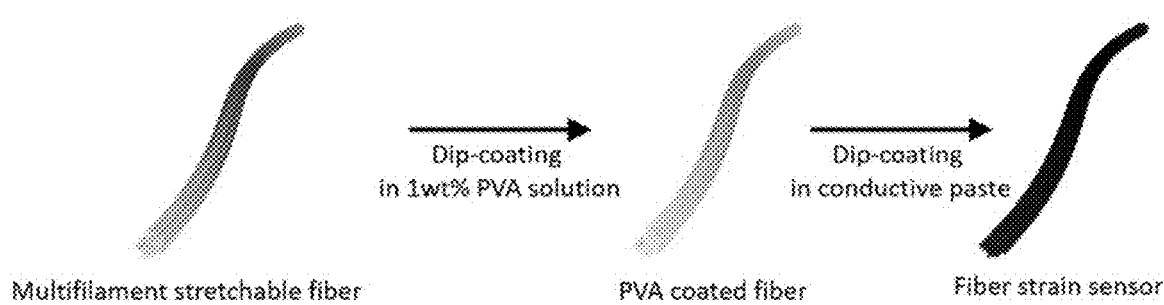

[FIG. 5]
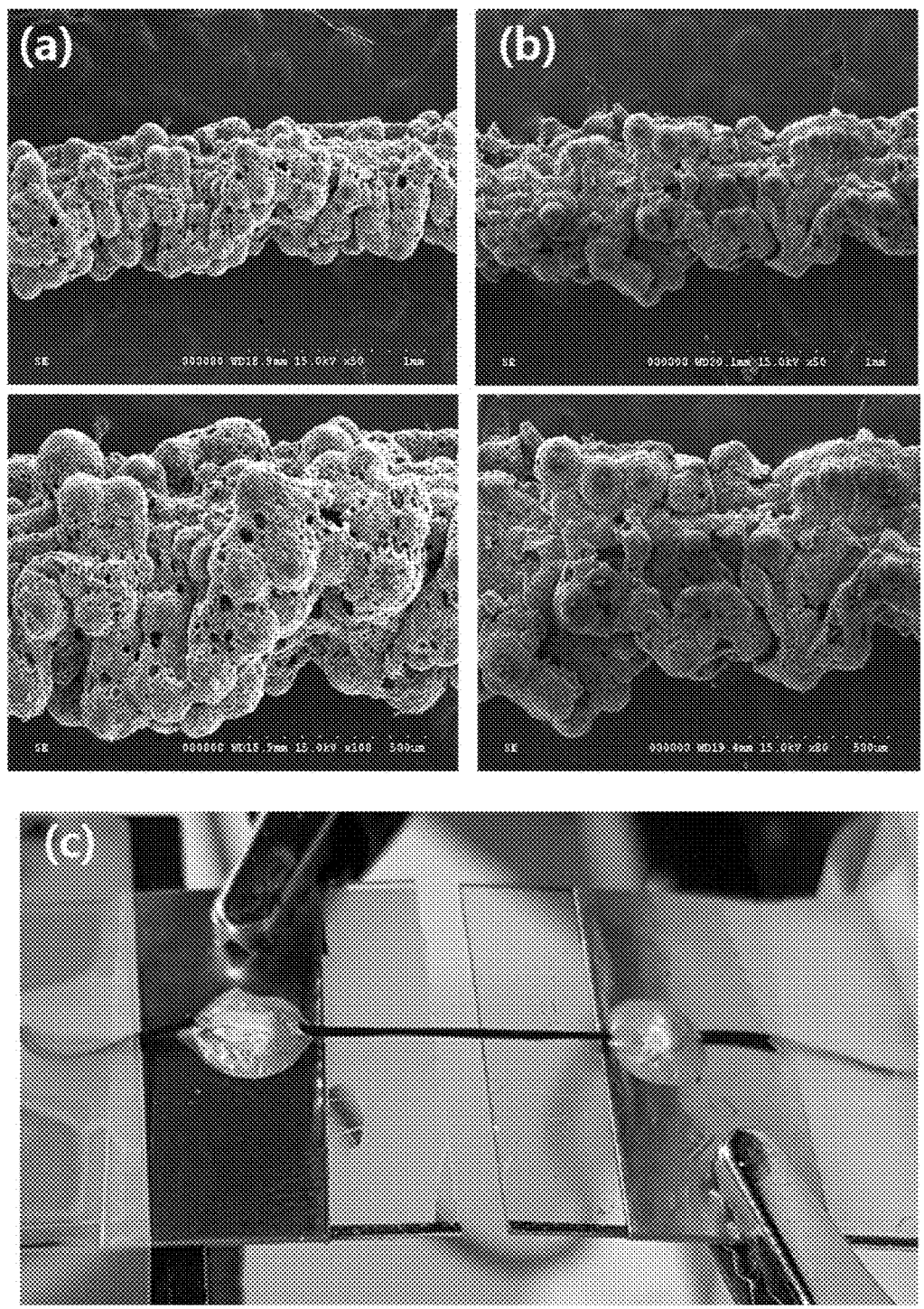

[FIG. 6]
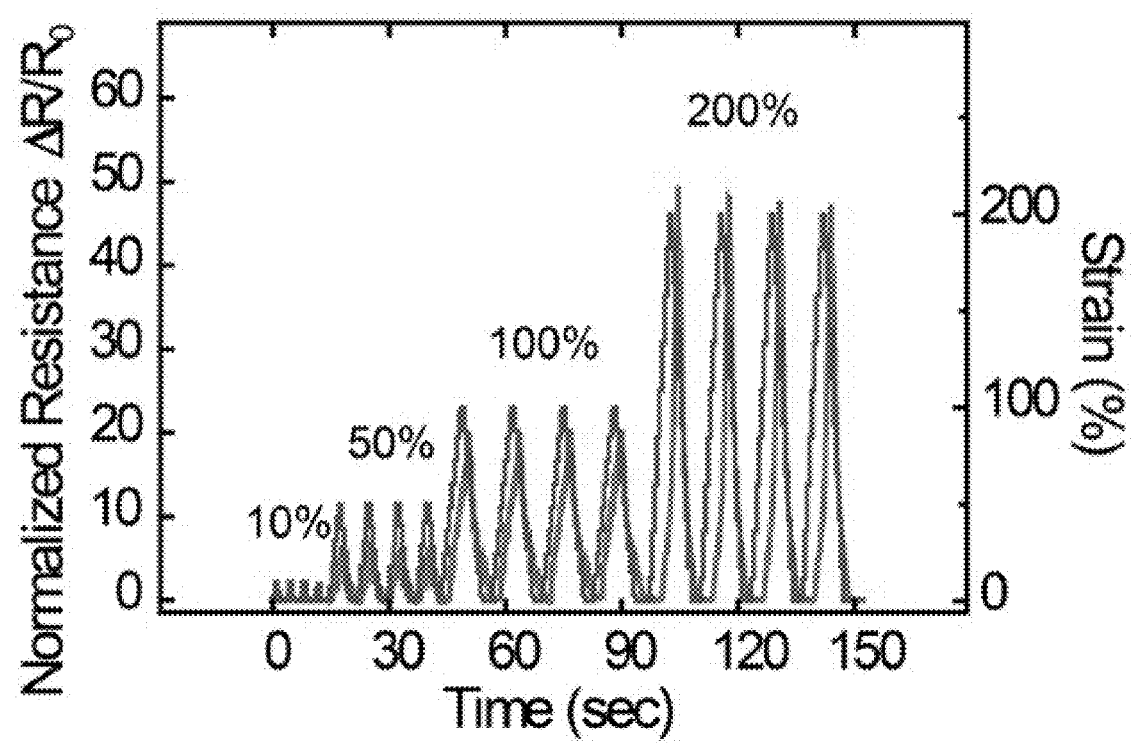

[FIG. 7]
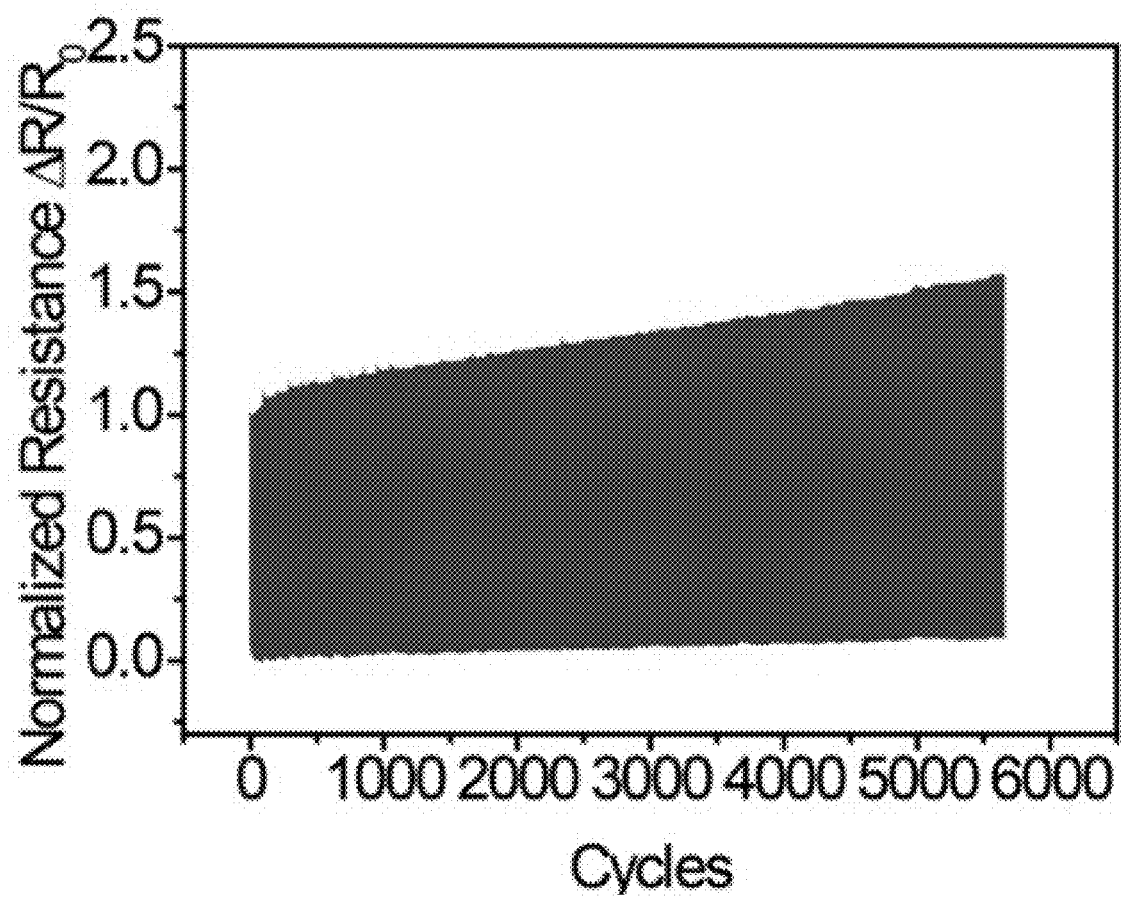

[FIG. 8]
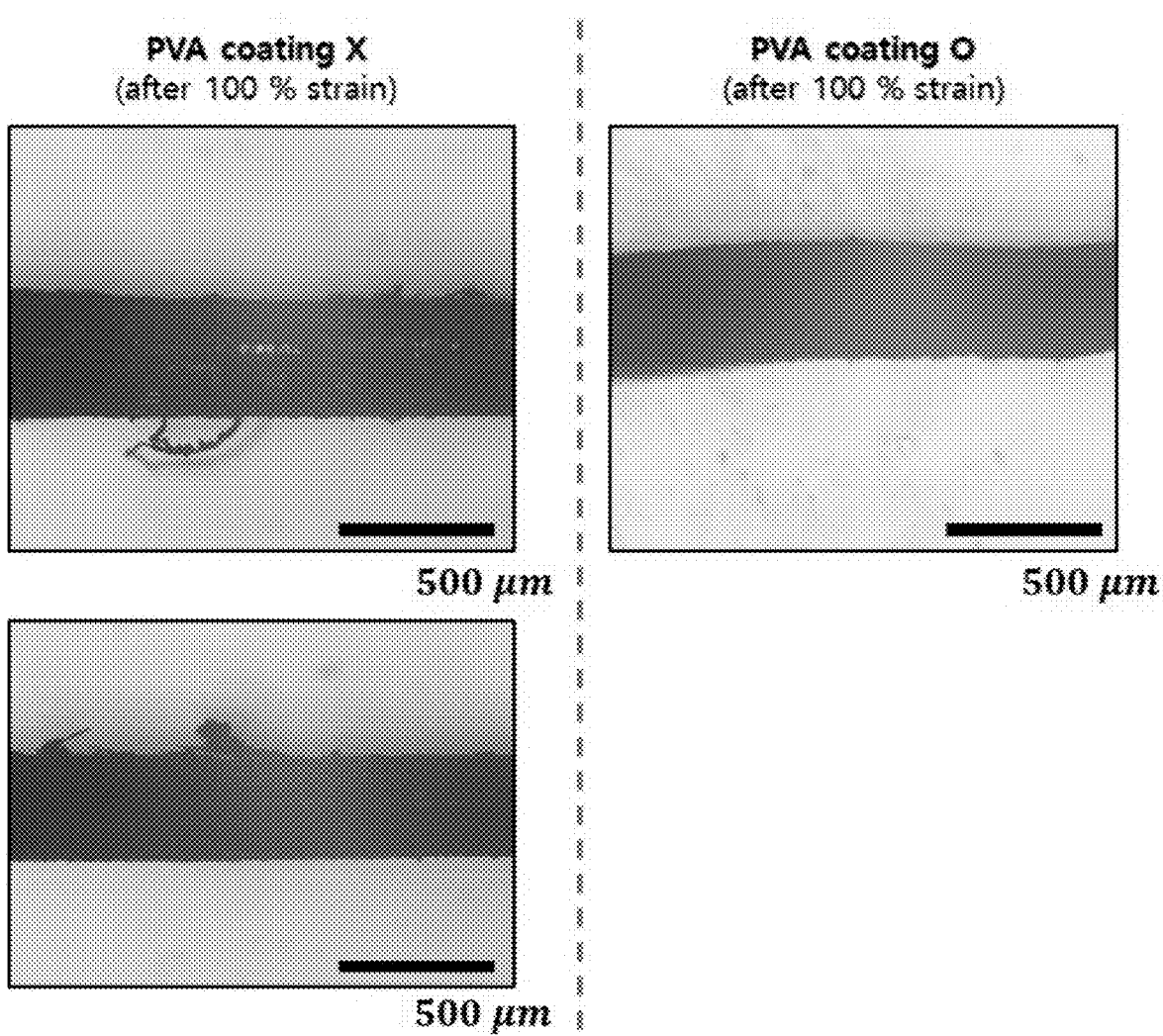

[FIG. 9]
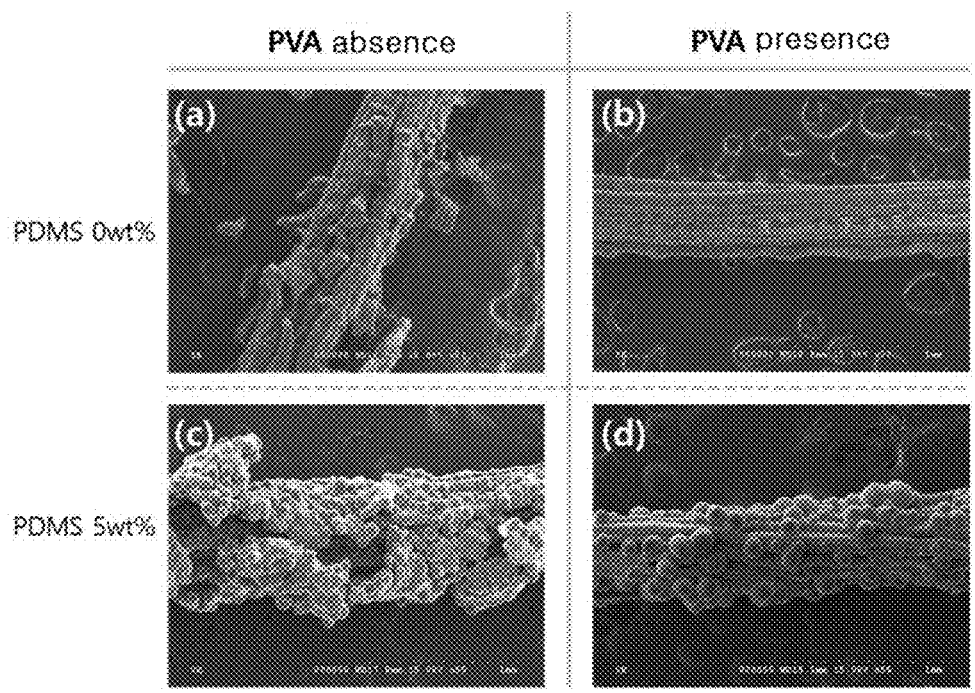
[FIG. 10]

[FIG. 11]
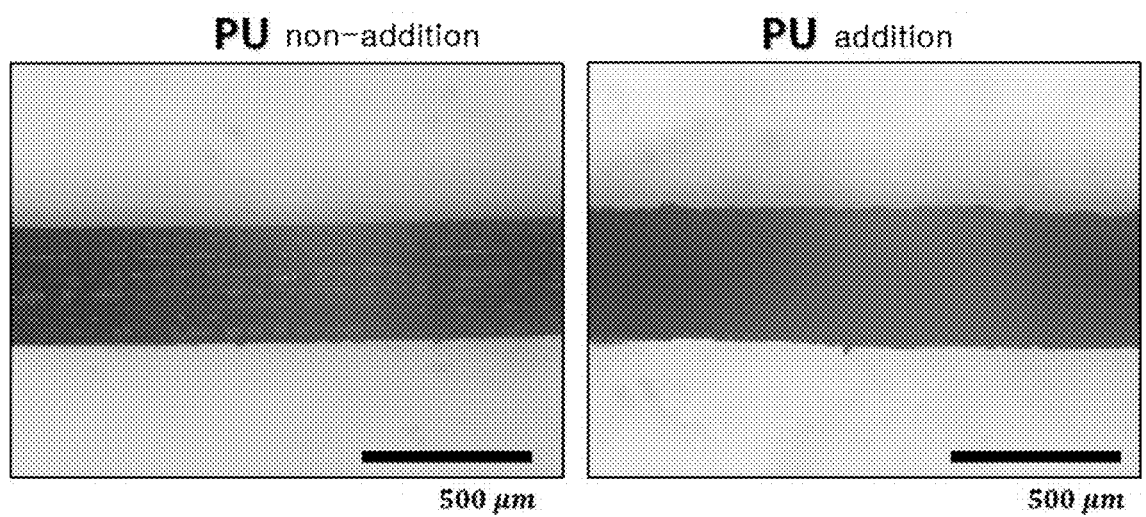

[FIG. 12]
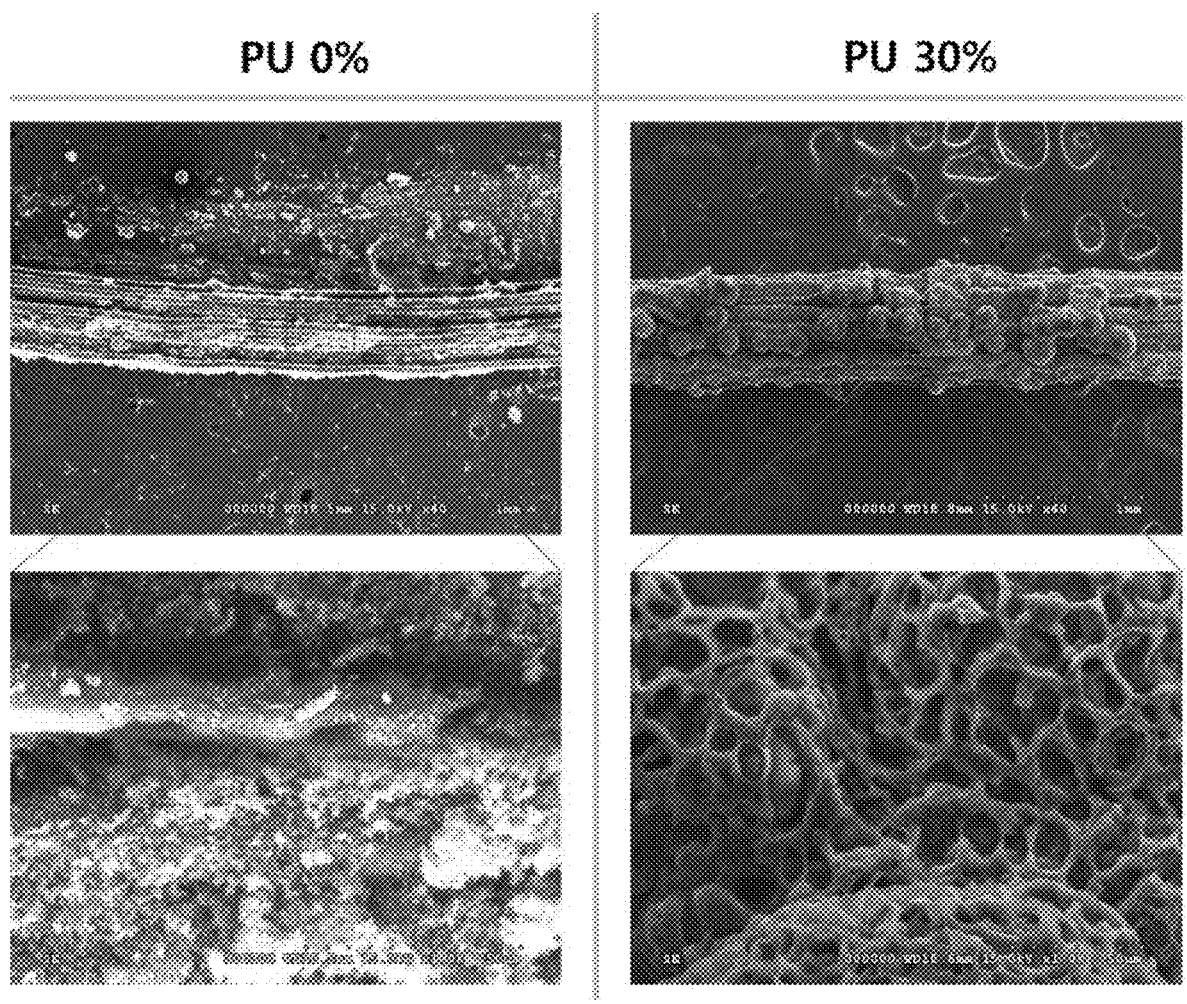

[FIG. 13]
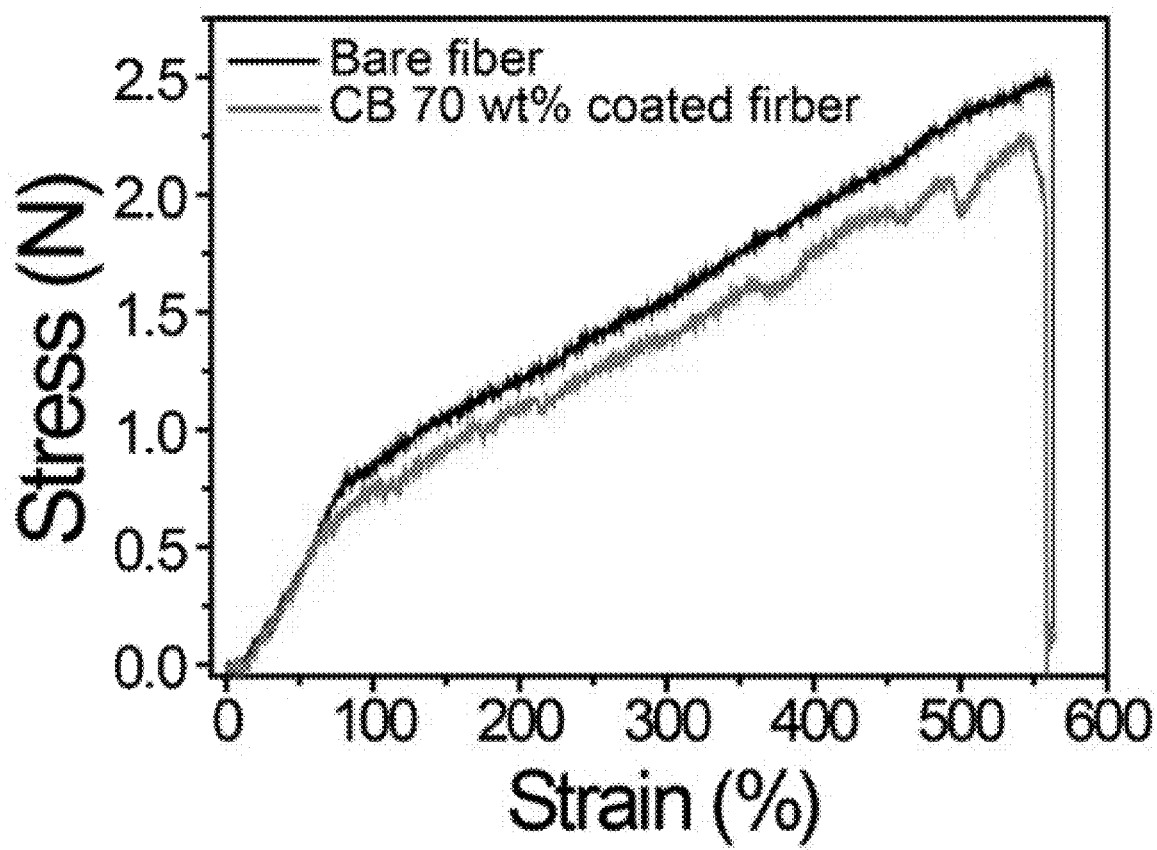

[FIG. 14]
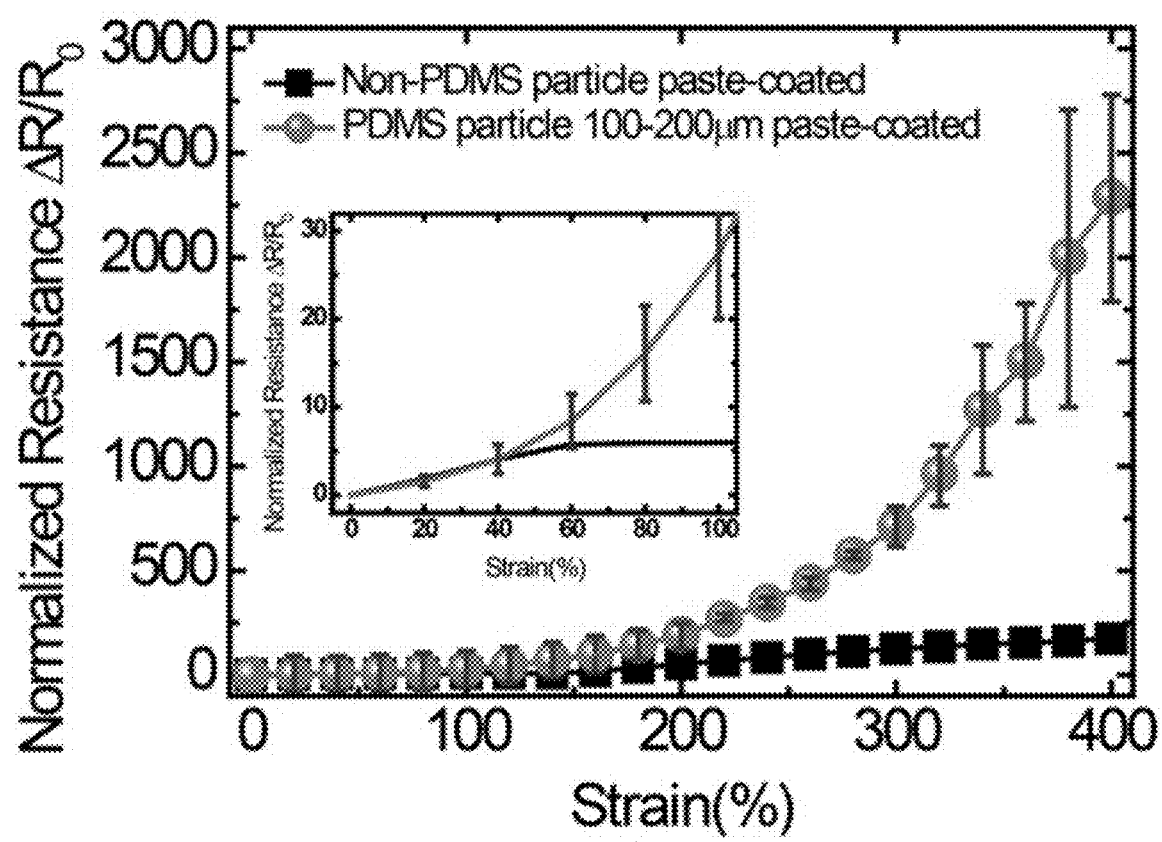

[FIG. 15]
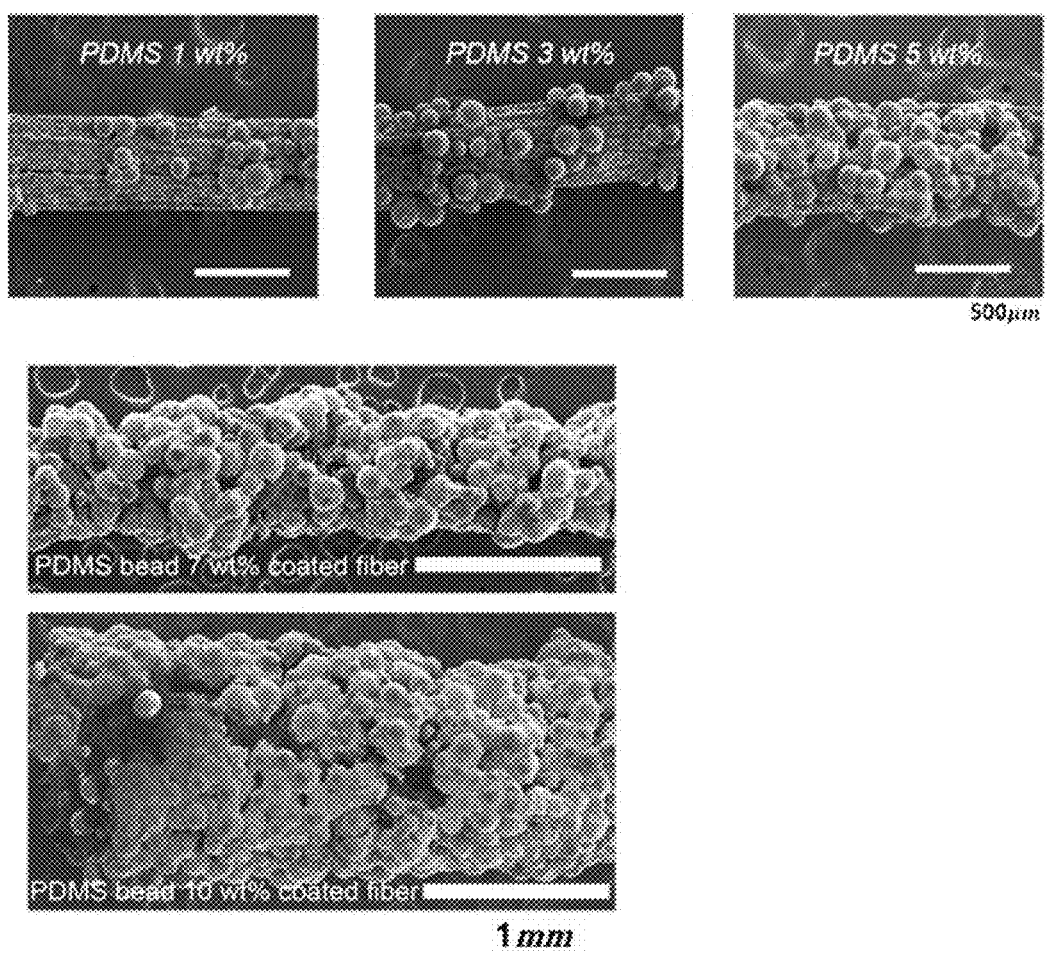

[FIG. 16]
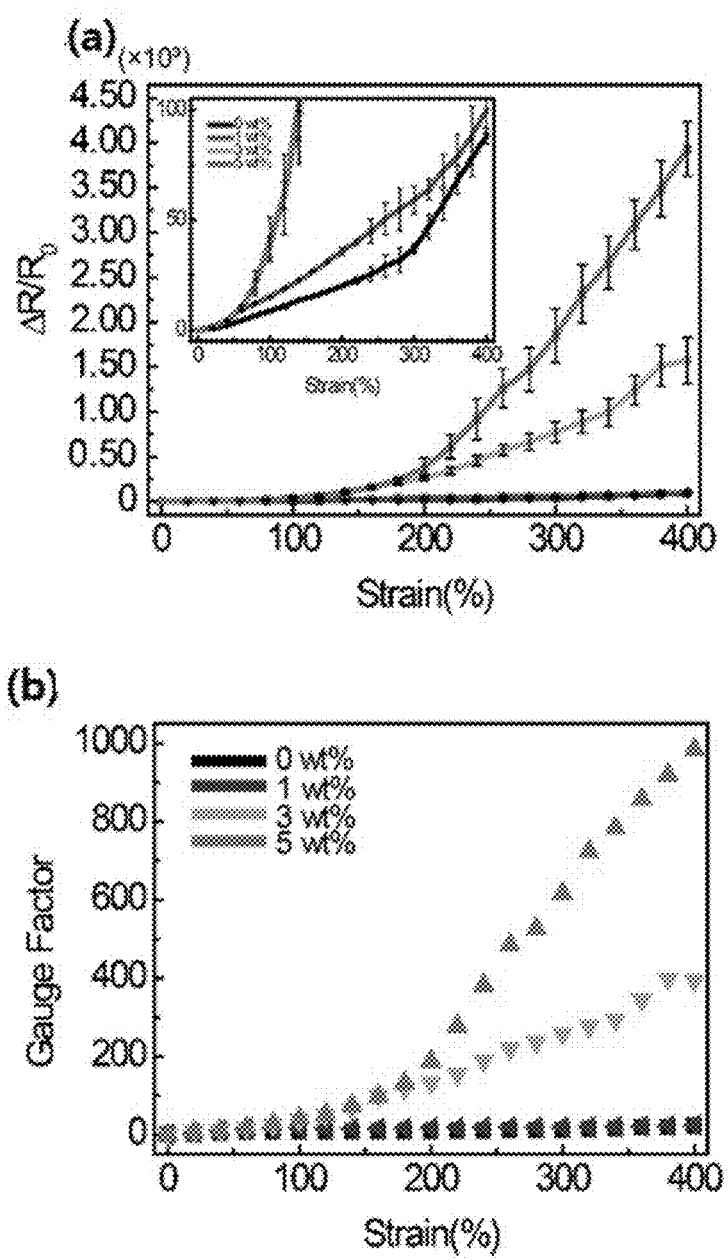

[FIG. 17]
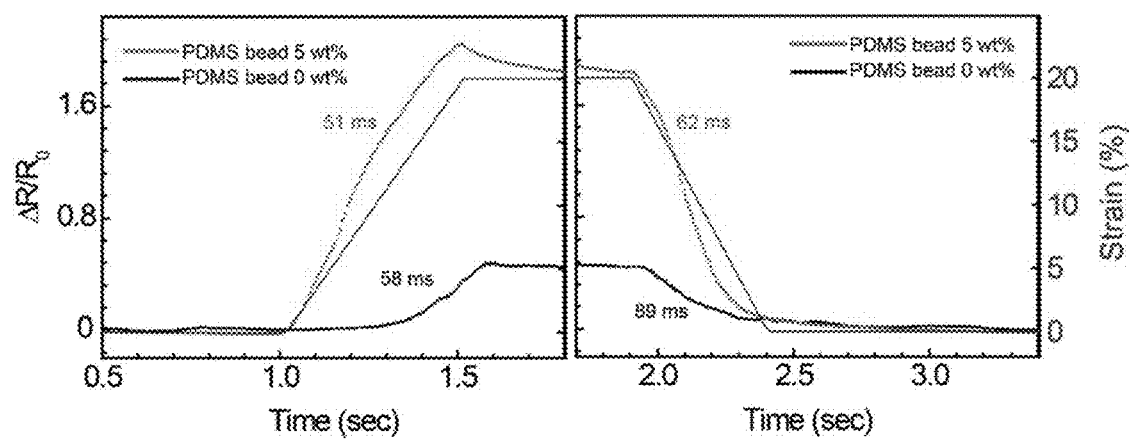

【FIG. 18】
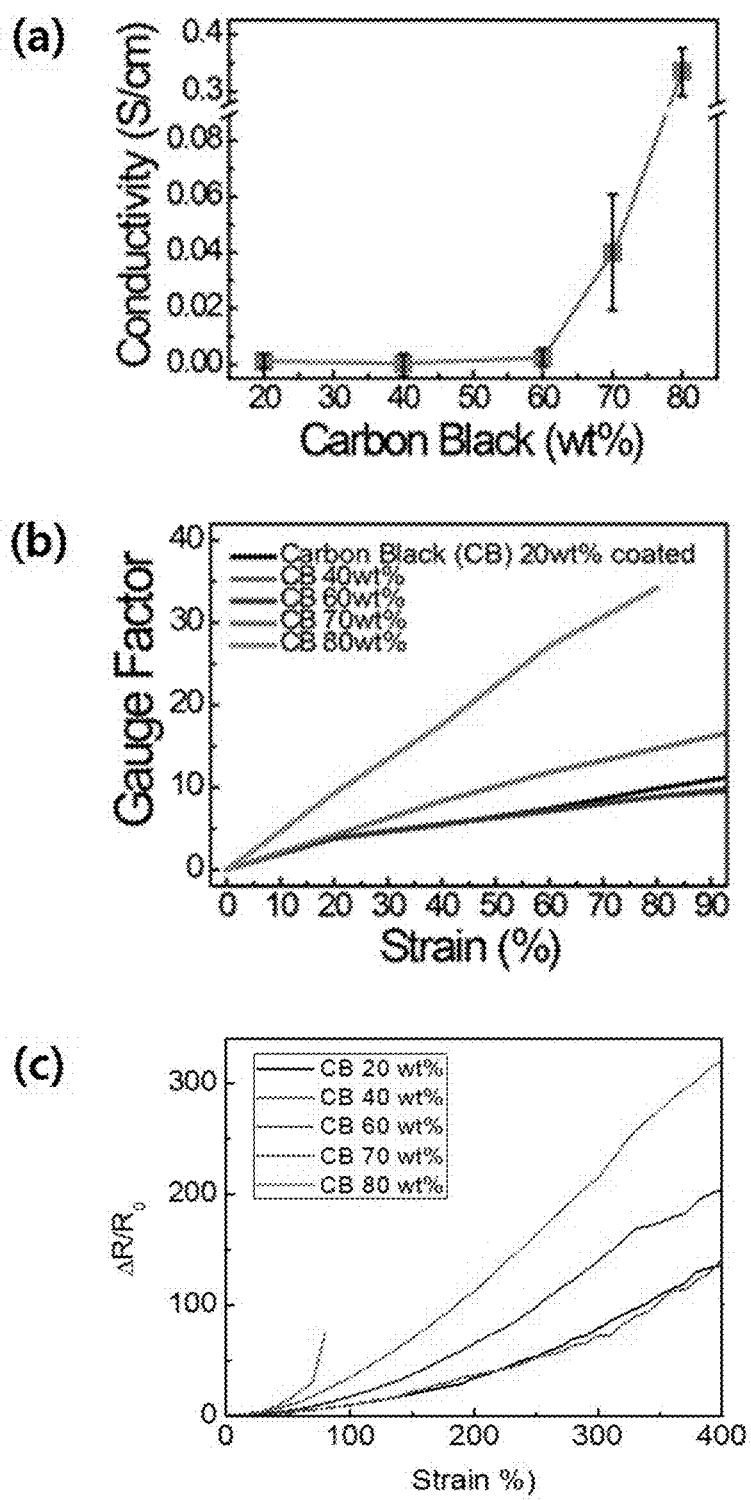

[FIG. 19]
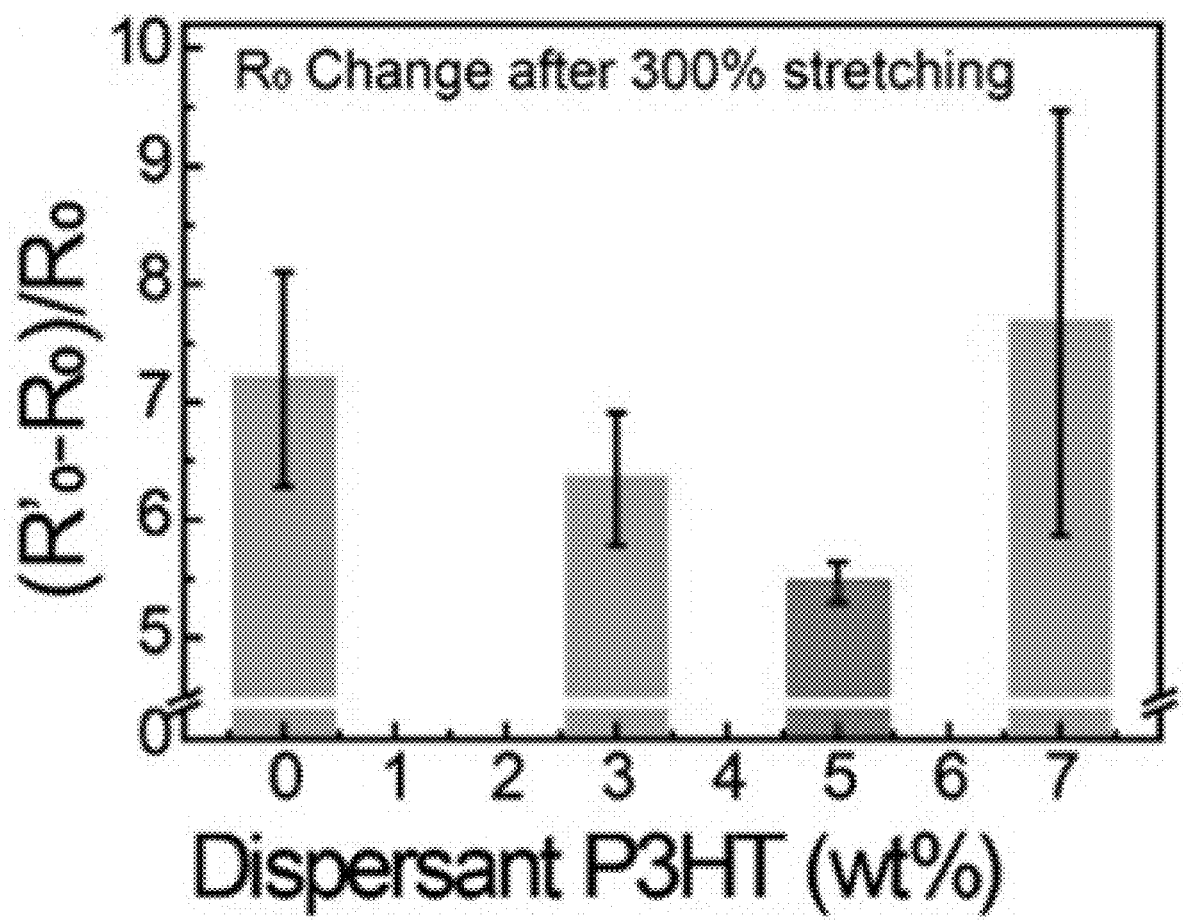

[FIG. 20]
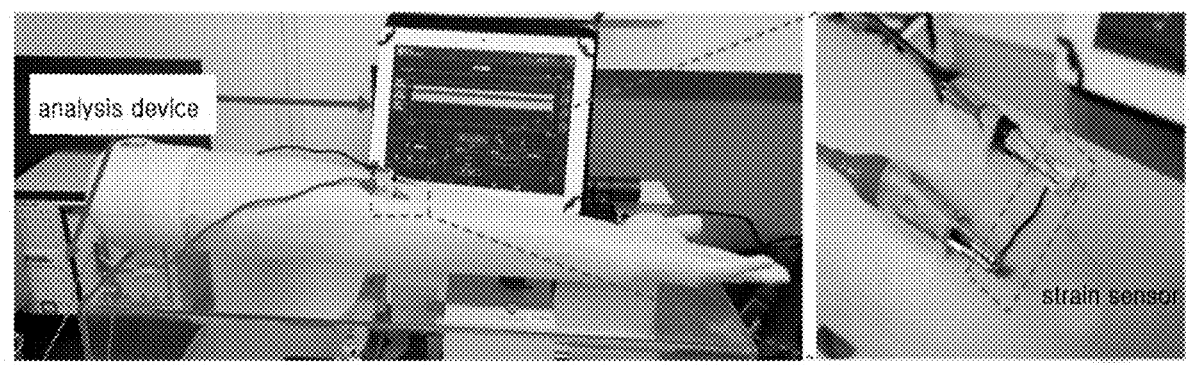
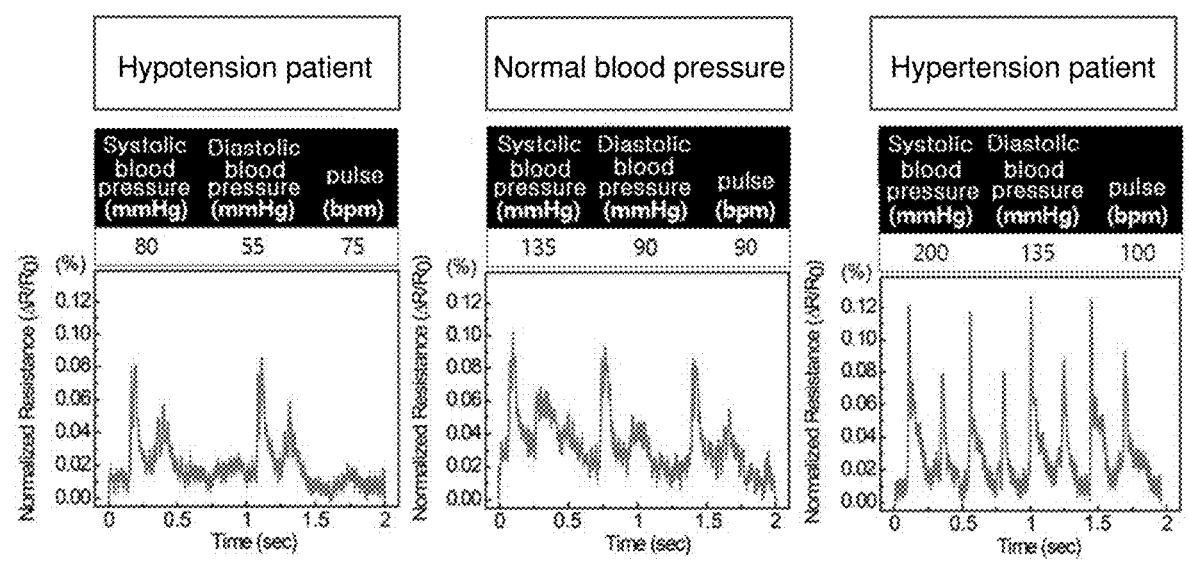

FIBER COMPOSITE AND PREPARING METHOD OF THE SAME

CROSS-REFERENCE TO RELATED APPLICATIONS

This application claims the benefit under 35 U.S.C. 119(a) of Korean Patent Application No. 10-2018-0104519, filed on Sep. 3, 2018, and Korean Patent Application No. 10-2019-0099308, filed on Aug. 14, 2019, in the Korean Intellectual Property Office, the entire disclosures of which are incorporated herein by reference for all purposes.

BACKGROUND

1. Field

The present disclosure relates to a fiber composite and a method for producing the same, and more particularly to a fiber composite for a strain sensor and a method for producing the same.

2. Description of Related Art

In a wearable device market which has recently been attracting attention, research into a wearable fiber sensor is being actively conducted. Researches on the fiber sensor not only in use in specialty garments such as firefighting and military garments but also for lifestyle care via monitoring of body movements have been in the spotlight. It is important for a fibrous strain sensor utilized in these fields to maintain elasticity and sensitivity at and to a strong strain and to have high sensitivity to a small strain.

However, a conductive fiber used in a conventional fibrous strain sensor may have flexibility and comfort, and thus may not be applied to actual clothing. In addition, the conductive fiber used in the existing strain sensor has a disadvantage that an expensive material is used, and a production cost is high and thus the fiber mass production is not easy, thereby to limit generalization of a smart wear using the conventional conductive fiber.

Research and development has been conducted to solve the above problems and has difficulties in practical application to the actual clothing. Therefore, there is a strong demand for development of a fiber realization technique that simultaneously achieves a low cost, use of harmless materials, high durability and excellent sensing sensitivity.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a fiber composite for a strain sensor at a low cost, with use of harmless materials, and with high durability and excellent sensing sensitivity.

Another purpose of the present disclosure is to provide a method of producing a fiber composite for a strain sensor.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

As used herein, a strain sensor refers to a sensor that detects a mechanical change of an object to be measured and converts the change into an electric signal.

As used herein, a polymer bead means a cure bead of at least one polymer material present in a solid state. The polymer bead has a spherical independent shape with a diameter between 100 μm and 200 μm. However, the present disclosure is not necessarily limited thereto.

As used herein, a term "stretchable fiber" may refer to a fiber having an extending or shrinking ability.

A first aspect of the present disclosure proposes a fiber composite for a strain sensor, the composite comprising: a stretchable fiber; a conductive elastic polymer layer coated on the stretchable fiber; polymer beads disposed on the stretchable fiber or on the elastic polymer layer; and a conductive elastic polymer layer covering the polymer beads.

In one implementation of the first aspect, the conductive elastic polymer layer includes an elastic polymer and conductive particles dispersed in the elastic polymer.

In one implementation of the first aspect, the conductive particles include at least one of carbon black particles, carbon nano tubes (CNT) or graphene.

In one implementation of the first aspect, each of the polymer beads has a diameter between 100 μm and 200 μm.

In one implementation of the first aspect, the polymer beads are cured polymer beads.

In one implementation of the first aspect, each of the elastic polymer and the polymer bead independently includes at least one selected from a group consisting of natural rubber, nitrile rubber, acrylonitrile-butadiene rubber, styrenebutadiene rubber, chloroprene rubber, butyl rubber, isoprene-isobutylene rubber, ethylene propylene rubber, chlorosulphonated polyethylene rubber, acrylic rubber, fluoro rubber, polysulfide rubber, silicone rubber, butadiene rubber, isoprene rubber, urethane rubber, polyurethane, PDMS (polydimethylsiloxane), polyolefin thermoplastic elastomer (TPE), TPE (polystyrene TPE), polyvinyl chloride TPE, polyester TPE, polyurethane TPE, and polyamide TPE.

In one implementation of the first aspect, the elastic polymer is polyurethane.

In one implementation of the first aspect, each of the polymer beads is made of PDMS.

In one implementation of the first aspect, the stretchable fiber includes polyurethane based fiber.

In one implementation of the first aspect, the stretchable fiber is coated with polyvinyl alcohol (PVA), wherein the conductive elastic polymer layer contains polyurethane and has carbon black particles dispersed therein, wherein each of the polymer beads is made of PDMS.

A second aspect of the present disclosure proposes a method for producing a fiber composite for a strain sensor, the method comprising: providing a polymer solution formed by mixing an organic solvent, an elastic polymer dissolvable in the organic solvent, polymer beads insoluble in the organic solvent, and conductive particles with each other; and coating the polymer solution on a stretchable fiber.

In one implementation of the second aspect, the polymer solution further contains a dispersant.

In one implementation of the second aspect, the dispersant includes P3HT (poly (3-hexylthiophene)).

In one implementation of the second aspect, the elastic polymer includes polyurethane.

In one implementation of the second aspect, the polymer beads include cured PDMS beads.

In one implementation of the second aspect, the organic solvent includes at least one selected from a group consisting of chloroform, dimethylformamide (DMF), toluene, dimethyl sulfoxide (DMSO), and N-methylpyrrolidone (NMP).

In one implementation of the second aspect, the conductive particles include at least one of carbon black particles, carbon nano tubes (CNT) or graphene.

In one implementation of the second aspect, the polymer solution contains carbon black particles, cured PDMS beads, and polyurethane in the organic solvent.

In one implementation of the second aspect, the stretchable fiber is coated with polyvinyl alcohol (PVA).

Effects of the present disclosure are as follows but are not limited thereto.

The fiber composite in accordance with the present disclosure is produced using a simple production method. The conductive material and elastic polymer are disposed on a surface of the stretchable or elastic fiber material of the fiber composite. Thus, the fiber composite is durable and stable. Therefore, the strain sensor produced using the fiber composite exhibits excellent durability, recoverability, repeatability and sensitivity, and a fast sensing speed.

In addition to the effects as described above, specific effects of the present disclosure are described together with specific details for carrying out the invention.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 1 is a diagram for describing a fiber composite for a strain sensor according to the present disclosure.

FIG. 2 illustrates a polymer beads producing method according to the present disclosure.

FIG. 3 is a diagram to describe a producing method of a polymer solution according to the present disclosure.

FIG. 4 is a drawing to describe a producing method of a fiber composite for a strain sensor according to the present disclosure.

FIG. 5 is a view showing an SEM image for surface analysis of a fiber composite for a strain sensor produced according to an embodiment of the present disclosure. (a) of FIG. 5 is a view showing a surface image of a fiber composite for a strain sensor produced according to an embodiment of the present disclosure before applying a strain thereto. (b) of FIG. 5 is a view showing a surface image of a fiber composite for a strain sensor produced according to an embodiment of the present disclosure after applying a strain thereto. (c) of FIG. 5 is an image of a strain sensor including a fiber composite for a strain sensor produced according to an embodiment of the present disclosure.

FIG. 6 shows a graph of a response rate and a resistance change based on a strain of a sensor containing a fiber composite for a strain sensor produced according to one embodiment of the present disclosure.

FIG. 7 shows a graph for evaluating stability of a sensor containing a fiber composite for a strain sensor produced according to one embodiment of the present disclosure.

FIG. 8 shows a surface image for surface comparison analysis of a fiber composite for a strain sensor based on PVA coating or non-coating.

FIG. 9 shows a SEM image for surface comparison analysis of a fiber composite based on PVA coating or non-coating and PDMS addition or non-addition. (a) and (b) of FIG. 9 are images showing a surface of each fiber composite as produced based on PVA coating or non-coating when the composite does not contain polymer beads. (c) and (d) of FIG. 9 are images showing a surface of each fiber composite produced based on PVA coating or non-coating when the composite contains 5 wt % of polymer beads.

FIG. 10 shows an image of a fiber composite for a strain sensor based on PU addition or non-addition.

FIG. 11 shows an optical microscope (OM) image for surface comparison analysis of a fiber composite based on PU addition or non-addition.

FIG. 12 shows a SEM image for surface comparison analysis of a fiber composite based on PU addition or non-addition.

FIG. 13 shows a graph for evaluating mechanical properties of a fiber composite for a strain sensor depending on presence or absence of polymer beads.

FIG. 14 is a diagram to compare a response rate of a sensor produced using a fiber composite based on an added content of polymer beads.

FIG. 15 shows a surface SEM image of a fiber composite as produced according to the present disclosure based on a polymer beads content.

FIG. 16 shows a graph for evaluating performance of a strain sensor based on an added content of polymer beads. (a) of FIG. 16 is a graph showing a resistance based on a strain of a strain sensor based on an added content of polymer beads. (b) of FIG. 16 is a graph showing a gauge factor based on a strain of a sensor based on an added content of polymer beads.

FIG. 17 is a diagram to evaluate performance of a strain sensor based on an added content of the polymer beads.

FIG. 18 is a diagram to evaluate performance of a strain sensor based on a weight percentage of carbon black. (a) of FIG. 18 is a graph showing conductivity of a strain sensor based on a weight percentage of carbon black. (b) of FIG. 18 is a graph showing stability of a strain sensor based on a weight percentage of carbon black. (c) of FIG. 18 is a graph showing resistance change of a strain sensor based on a weight percentage of carbon black.

FIG. 19 is a diagram to evaluate performance of a sensor based on an added content of a dispersant after applying 300% strain thereto.

FIG. 20 shows pulse measurement by a strain sensor containing a fiber composite produced according to one embodiment of the present disclosure.

DETAILED DESCRIPTIONS

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to a fiber composite for a strain sensor and a method for producing the same. First, the fiber composite for a strain sensor produced according to a production method according to the present disclosure will be described with reference to FIG. 1.

Referring to FIG. 1, a fiber composite according to the present disclosure may include a stretchable fiber; a conductive elastic polymer layer coated on the stretchable fiber; polymer beads disposed on the stretchable fiber or on the elastic polymer layer; and a conductive elastic polymer layer coating the polymer beads.

Referring to (1) of FIG. 1, the stretchable fiber according to the present disclosure may be a fiber stretchable or extendable and shrinkable. The stretchable fiber according to the present disclosure may be a polyurethane-based fiber and may be a spandex which is a synthetic fiber made of elastic yarns of a polyurethane fiber. However, the present disclosure is not limited thereto. The stretchable fiber according to the present disclosure may be a fiber that can be reliably restored to its original form in the stretching and shrinking process. In addition, the stretchable fiber may be a stretchable fiber coated with polyvinyl alcohol (hereinafter referred to as PVA). The coating of the PVA may be used to increase adhesion between the stretchable fiber and the conductive elastic polymer layer. Specifically, a OH terminal group of the PVA may have hydrogen-bonding with —OH terminal group of a conductive particle to achieve an effect of increasing an adhesive force between the stretchable fiber and the conductive elastic polymer layer.

Referring to (ii) and (iii) of FIG. 1, it may be seen that the fiber composite according to the present disclosure includes the stretchable fiber or the stretchable fiber coated with PVA and the conductive elastic polymer layer coated on the stretchable fiber or the stretchable fiber coated with PVA.

The polymer beads are present on the conductive elastic polymer layer or on the stretchable fiber. The polymer beads may be coated with a conductive elastic polymer layer.

The conductive elastic polymer layer may include an elastic polymer and conductive particles dispersed in the elastic polymer. The conductive particles may include at least one of carbon black particles, carbon nanotubes and graphene. Preferably, the conductive particles may include carbon black. When the carbon black particles are used as the conductive particles, it is preferable to add 70 wt % of carbon black thereto. Due to the addition of the conductive particles, the fiber composite according to the present disclosure can have excellent conductivity. This affects performance of the strain sensor.

The polymer beads may be formed by curing one or more polymer materials to in a solid state. Each bead has a spherical independent shape with a diameter between 100 μm and 200 μm. Preferably, the polymer beads may be beads made of PDMS. However, the present disclosure is not necessarily limited thereto.

The fiber composite according to the present disclosure may have unevenness due to the polymer beads. When the composite is used in a strain sensor, the elastic polymer layer or stretchable fiber may allow the polymer beads not to be separated from the elastic polymer layer or stretchable fiber and to be restored to its original shape stably when the strain is applied to the sensor. This effect may be achieved because the polymer beads are coated with the conductive elastic polymer layer.

The production method of the fiber composite for the strain sensor according to the present disclosure is described with reference to FIG. 2, FIG. 3 and FIG. 4.

First, the polymer beads according to the present disclosure be formed by curing one or more polymer materials to in a solid state. Each bead has a spherical independent shape with a diameter between 100 μm and 200 μm. Referring to (a) in FIG. 2, a method of producing the polymer beads according to the present disclosure is described first. This method may include dissolving PVA in a polymer material solution and tertiary distilled water to form a dissolved solution and then converting the dissolved solution into an emulsion using a membrane emulsification device. The produced polymer material emulsion may be cured using an oven to produce the beads. In an additional step, the cured polymer beads may be washed with water and ethanol and then dried to produce the beads.

In this connection, referring to (b) in FIG. 2 showing a microscope image of the produced polymer beads, each of the polymer beads is present in a form of an individual spherical particle. Each of the polymer beads may have a diameter between 100 and 200 μm, but are not necessarily limited thereto.

Referring to FIG. 3, the polymer solution producing method according to the present disclosure will be described. A first step thereof is to dissolve an elastic polymer in an organic solvent. The organic solvent may be a liquid organic material capable of dissolving the elastic polymer, and may be at least one selected from a group consisting of chloroform, dimethylformamide (DMF), toluene, and dimethyl sulfoxide (DMSO), and methylpyrrolidone (NMP). Preferably, the solvent may be chloroform. However, the present disclosure is not necessarily limited thereto. The method may include mixing a dispersant with the solution in which the elastic polymer is dissolved. Then, the method may include mixing and dispersing conductive particles with and in the solution and then mixing and dispersing the polymer beads with and in the solution in which the conductive particles are dispersed. Thus, the polymer solution according to the present disclosure may be prepared. In this connection, the polymer beads in the polymer solution may be present in a state in which the beads are not dissolved in the organic solvent while the beads maintain the solid state in the polymer solution.

Referring to FIG. 4, we describe a method of producing a fiber composite for a strain sensor according to the present disclosure using the cured polymer beads and polymer solution as prepared above. The producing method of the fiber composite may include a step of coating a PVA solution onto the stretchable fiber and impregnating the PVA coated fiber with the polymer solution. After the coating step, the method may further include a drying thereof. In one example of the present disclosure, the coating step may be performed using a dip-coating scheme, but is not necessarily limited thereto.

Hereinafter, a fiber composite for a strain sensor according to the present disclosure and a method for producing the same will be described in more detail based on specific Present Examples and Comparative Examples.

PRESENT EXAMPLE 1

Production of Fiber Composite for Strain Sensor 1-1. Production of Polymer Beads Sylgard 184 Silicone Elastomer Kit (Dow Corning, USA) Part A and Part B were mixed with each other in a 6: 4 mass percentage ratio to produce 4 mL of a mixed solution. We dissolved 5 wt % PVA in 80 mL of tertiary distilled water to produce a dissolved solution. Then, a PDMS emulsion was produced based on the mixed solution and the dissolved solution using an SPG membrane emulsification device. We put the emulsion into an oven in which the emulsion was cured in an atmosphere of 70° C. to form cured particles, which, in turn, were washed with water and ethanol and dried, thereby to produce PDMS based polymer beads according to Present Example 1 (1-1) according to the present disclosure.

1-2. Production of Polymer Solution

We added 0.74 g of polyurethane to 20 g of chloroform as an organic solvent and applied sonication thereto for 30 minutes, thereby to produce a solution in which the polyurethane is dissolved. P3HT (poly(3-hexylthiophene)) as a dispersant was added to the solution, followed by sonication thereto for 5 minutes to produce an intermediate solution. Then, 1.26 g of carbon black as conductive particles was added to the intermediate solution, followed by sonication thereto for 10 minutes. Then, 5 wt % of the PDMS polymer beads produced according to Present Example 1 was added thereto, followed by sonication thereto for 10 minutes. In this way, a polymer solution was produced according to Present Example 1 (1-2) according to present disclosure.

1-3. Production of Fiber Composite for Strain Sensor

After coating a 1 wt % PVA solution on a spandex polyurethane fiber using a dip-coating method, the PVA coated fiber was impregnated in the polymer solution according to Present Example 1 (1-2) according to the present disclosure. Then, the polymer solution containing the PVA coated fiber therein was subjected to sonication for 5 minutes, and then, a drying process was performed, thereby to produce a fiber composite for a strain sensor according to Present Example 1 of the present disclosure.

COMPARATIVE EXAMPLE 1

The same process as the production process of the fiber composite for the strain sensor according to Present Example 1 of the present disclosure was performed except for excluding coating the 1 wt % PVA solution on the spandex polyurethane fiber using a dip-coating method, thereby producing the fiber composite for a strain sensor according to Comparative Example 1 of the present disclosure.

COMPARATIVE EXAMPLE 2

The same process as the production process of the fiber composite for the strain sensor according to Present Example 1 of the present disclosure was performed except for adding 0.74 g polyurethane (PU) in the production of the polymer solution, thereby producing the fiber composite for a strain sensor according to Comparative Example 2 of the present disclosure.

EXPERIMENTAL EXAMPLE 1

Surface Analysis of Fiber Composite for Strain Sensor

Surface images were obtained by scanning electron microscopy (SEM) to analyze the surface of the fiber composite produced according to Present Example 1 of the present disclosure. The obtained surface image is shown in FIG. 5 is shown.

FIG. 5 is an image showing the surface of the fiber composite for a strain sensor according to Present Example 1 of the present disclosure using a scanning electron microscope (SEM).

Referring to the surface of the fiber composite in (a) of FIG. 5, it may be seen that the polymer beads and the conductive elastic polymer layer are uniformly coated on the stretchable fiber and, due to the polymer beads, an uneven surface may be identified. Referring to the surface of the fiber composite in (b) of FIG. 5 after applying the strain thereto, it may be seen that the polymer beads are not separated from the stretchable fiber and a spacing between the polymer beads after applying the stain thereto is larger than a spacing between the polymer beads before applying the stain thereto. Referring to an image of a strain sensor produced using the fiber composite in (c) of FIG. 5, the sensor in which electrodes are attached and connected to the fiber composite via copper tape and conductive paste can electrically detect a minute strain change. Referring to FIG. 5, it may be seen that the fiber composite according to the present disclosure is stably restored to its original form in the extending and shrinking process.

EXPERIMENTAL EXAMPLE 2

Performance Evaluation of Strain Sensor

In order to perform performance evaluation on the strain sensor containing the fiber composite produced according to Present Example of the present disclosure, strains of 10%, 50%, 100% and 200% were applied thereto and then response rates and resistance changes were measured. The result is shown in FIG. 6.

Referring to 6, it may be seen that when the same strain is repeatedly applied to the sensor, the sensor exhibits a fast response rate and a sensitive resistance change.

Subsequently, in order to evaluate stability of the strain sensor containing the fiber composite produced according to Present Example of the present disclosure, a resistance was measured while applying 20% strain to the sensor 5000 times. Then, the stability of the strain sensor was evaluated based on the measured resistance. The result is shown in FIG. 7.

Referring to FIG. 7, it may be seen that when applying 20% strain to the sensor 5000 times, the sensor containing the fiber composite produced according to the present example of the present disclosure maintains stability.

EXPERIMENTAL EXAMPLE 3

Comparative Evaluation of Fiber Composite for Strain Sensor Based on PVA Coating or Non-Coating To analyze a surface of the fiber composite for a strain sensor based on PVA coating or non-coating, the fiber composites for a strain sensor as produced according to the Present Example 1 and Comparative Example 1 of the present disclosure were employed. Each surface image of each fiber composite was obtained when 100% strain was applied to each fiber composite and then the fiber composite is returned to its original state. The images were obtained using OM (Optical Microscope) (Olympus BX51, Olympus, Japan), The result is shown in FIG. 8.

Referring to 8, in the fiber composite produced without the PVA coating treatment, the fiber composite surface is not smooth and foreign matters are separated from the surface. On the other hand, in the fiber composite produced with the PVA coating treatment, it may be seen that the surface has a smooth surface and foreign matters are not separated from the surface. Thus, the PVA coating may be expected to have an effect of improving the adhesive force so that the elastic polymer layer is well maintained on the stretchable fiber.

In order to check the adhesion between the conductive elastic polymer layer and the fiber based on the coating of the PVA as described above in detail, fiber composites for a strain sensor were produced based on presence or absence of the PVA coating and presence or absence of PDMS. When the strain was applied to each fiber composite and then the composite is returned to its original state, the surface image of each fiber composite was obtained using a scanning electron microscope (SEM). The result is shown in FIG. 9.

Referring to (a) and (b) of FIG. 9 comparing the surfaces of the fiber composite free of the PDMS based on PVA coating and non-coating, in the fiber composite produced without the PVA coating treatment in (a) of FIG. 9, the elastic polymer layer coated on the stretchable fiber could not be maintained thereon and the elastic polymer layer is separated from the fiber such that the surface of the fiber composite was uneven. On the other hand, in the fiber composite produced with the PVA coating treatment in (b) of FIG. 9, it may be seen that the surface of the composite is maintained to smooth, and the elastic polymer layer is stably maintained on the fiber. Thus, it may be seen that the PVA coating exhibits an effect that the elastic polymer layer can be well maintained on the stretchable fiber regardless of the presence or absence of the polymer beads.

Referring to (c) and (d) of FIG. 9 comparing the surfaces of the fiber composites containing 5 wt % of PDMS based on the PVA coating and non-coating, in the fiber composite produced without the PVA coating treatment in (c) of FIG. 9, the polymer beads are partially separated from the stretchable fibers, and the conductive elastic polymer layer is partially separated on the stretchable fiber. On the other hand, in the fiber composite produced with the PVA coating treatment in (d) of FIG. 9, the polymer beads are stably fixed on the PVA coated stretchable fiber, and the conductive elastic polymer layer is also stably fixed on the PVA coated stretchable fiber. Therefore, it may be seen that the PVA coating in accordance with the present disclosure not only improves adhesion between the fiber and the beads and the conductive elastic polymer layer to maintain the elastic polymer layer on the stretchable fiber, but also allows the polymer beads to adhere well to the stretchable fiber.

EXPERIMENTAL EXAMPLE 4

Comparative Evaluation of Fiber Composites for Strain Sensors Based on Polyurethane (PU) Addition or Non-Addition To compare the fiber composites for the strain sensor based on the presence or absence of polyurethane, the fiber composites for a strain sensor produced according to the Present Example 1 and Comparative Example 2 of the present disclosure were compared with each other. The comparative analysis will be described with reference to FIG. 10.

Referring to 10, it may be seen that in the fiber composite (left) that does not contain polyurethane according to Comparative Example 2, black particles are separated from the fiber composite. This may be confirmed that when the fiber composite is actually held by hand, carbon black contacts the hand and thus the elastic polymer layer is unstably maintained. On the other hand, it may be seen that in the fiber composite (right) containing polyurethane, the coating is well maintained while the particles are not separated from the fiber composite. Thus, referring to FIG. 10, when producing the fiber composite containing the polyurethane, it may be expected that the polyurethane will hold the carbon black particles and PDMS polymer beads.

Subsequently, in order to compare surfaces of the fiber composites for a strain sensor as produced according to the Present Example 1 and Comparative Example 2 of the present disclosure, the surfaces of the fiber composites thereof were imaged using OM (Optical Microscope) (Olympus BX51, Olympus, Japan). The result is shown in FIG. 11.

Referring to FIG. 11, it may be seen that the surfaces based on both of the presence and absence of the polyurethane have a smooth appearance.

Thus, for a more detailed surface analysis, the SEM (Scanning Electron Microscope) was used to obtain the surface images of the fiber composites for the strain sensor as produced according to Present Example 1 and Comparative Example 2 of the present disclosure. The result is shown in 12.

Referring to FIG. 12, first, when analyzing the surface of the fiber composite for a strain sensor produced according to Comparative Example 2, in the composite fiber having polyurethane (PU) 30%, the conductive elastic polymer layer may have a mesh shape due to the polyurethane, and the polymer beads PDMS and carbon black are well fixed to the surface. To the contrary, carbon black and PDMS polymer beads could not be fixed to the surface of the fiber composite (PU 0%) that does not contain polyurethane, and the surface is very unstable. Therefore, it may be expected that polyurethane serves to help form the conductive elastic polymer layer in the mesh form, thereby fixing the PDMS and carbon black to the fiber.

EXPERIMENTAL EXAMPLE 5

Evaluation of Fiber Composite for Strain Sensor and Performance of Strain Sensor Based on Polymer Beads First, the fiber composite for the strain sensor and the sensor containing the composite were evaluated based on the presence or absence of polymer beads. PDMS was used as material of the polymer beads.

In order to evaluate the fiber composite for the strain sensor based on the presence or absence of the polymer beads, a stress corresponding to a strain applied to the fiber composite for the strain sensor produced based on the presence or absence of PDMS was measured. The result is shown in FIG. 13.

Referring to FIG. 13, it may be seen that a graph for the fiber composite containing PDMS shows a similar appearance compared to a graph of the fiber composite free of PDMS. This may indicate that the polymer beads may be maintained while not inhibiting the mechanical properties of the fiber composite.

In addition, a sensitivity of the strain sensor using the fiber composite based on the presence or absence of the polymer beads was measured to evaluate performance of the sensor. The result is shown in FIG. 14.

Referring to FIG. 14, it may be seen that the strain sensor (red) containing PDMS has a sensitivity up to about 13 times higher than that of the strain sensor (black) containing no PDMS. Therefore, it may be seen that the strain sensor produced using the fiber composite to which the polymer beads are added has high sensitivity.

Subsequently, the fiber composite produced based on a varying polymer beads ratio according to the present disclosure and the sensor containing the same were evaluated. The polymer beads used in the evaluation are PDMS based beads. The results are shown in FIG. 15 to FIG. 17.

FIG. 15 shows a SEM image of the fiber composite produced based on the varying polymer beads ratio according to the present disclosure.

Referring to FIG. 15, the polymer beads was separated from the surfaces of the fiber composites to which 1 wt % and 3 wt % of PDMS were added respectively and the polymer beads were not attached to the surface of the fiber. More polymer beads are attached to the surface of the fiber composite to which 3 wt % PDMS is added compared to a case when 1 wt % PDMS is added thereto.

On the other hand, most of polymer beads are attached to the surface of the fiber composite to which 5 wt % of PDMS is added and the polymer beads are in close contact with each other. In addition, it may be seen that polymer beads are added to substantially an entirety of the surface thereof.

Likewise, most of polymer beads are attached to the surfaces of the fiber composites to which 7 wt % and 10 wt % of PDMS are added respectively and the polymer beads are in close contact with each other. In addition, it may be seen that polymer beads are added to substantially an entirety of the surface thereof.

Referring to (a) and (b) of FIG. 16, it may be seen that in the strain sensor containing 0 wt % PDMS and the strain sensor containing 1 wt % PDMS, resistance and gauge factor changes based on the strain application may be negligible. On the other hand, it may be seen that in the strain sensor containing 3 wt % PDMS and the strain sensor containing 5 wt % PDMS, the resistance and gauge factor (gauge factor) change as the strain increases. Further, it may be seen that the strain sensor containing 5 wt % PDMS has a larger change in the resistance and gauge factor based on the strain application compared to the strain sensor containing 3 wt % PDMS.

Therefore, it may be seen that the sensitivity of the strain sensor increases as the content of the added PDMS increases. It may be seen that the sensitivity of the sensor to which 5 wt % of PDMS is added is the highest.

Further, referring to FIG. 17, when comparing the sensor with 5 wt % PDMS and the sensor with 0 wt % PDMS with each other, the sensor with 5 wt % PDMS showed a more sensitive response based on the same strain compared to the sensor with 0 wt % PDMS.

EXPERIMENTAL EXAMPLE 6

Performance Evaluation of Strain Sensor Based on Conductive Particles

In Present Example 1 of the present disclosure, the carbon black particle was used as the conductive particles to produce the fiber composites for the strain sensor. The carbon black particles were added to the fiber composites at different weight percentages (wt %). The performance evaluation of the sensor was performed by measuring the conductivity, stability and resistance of the strain sensors containing the produced fiber composites having the different weight percentages of the conductive particles. A result is shown in FIG. 18.

Referring to (a) in FIG. 18, it may be seen that the conductivity of the strain sensors to which 20, 40 and 60 wt % of the carbon black are added changes slightly based on the strain. On the other hand, it may be seen that the conductivity of the strain sensors having carbon black of 70 and 80 wt % greatly increases based on the strain. Thus, when the carbon black is added at a 60 wt % or greater content, this may achieve high conductivity characteristics and thereby affect the performance of the strain sensor.

Referring to (b) of FIG. 18, the strain sensors having 70 and 80 wt % of carbon black exhibited a larger change in a gauge factor based on the strain, compared to the strain sensors containing 20, 40 and 60 wt % of carbon black. When comparing the strain sensors with 70 and 80 wt % carbon black with each other, the gauge factor change of the strain sensor with 80 wt % carbon black was greater than the gauge factor change of the strain sensor with 70 wt % carbon black. Thus, when 80 wt % of carbon black is contained in the sensor, the stability of the sensor is sharply lowered.

Referring to (c) of FIG. 18, it may be seen that in the strain sensor having the carbon black 80 wt %, the change of resistance did not occur in the strain range of about 90% or greater. It may be seen that in the 20 and 40 wt % of the carbon black added strain sensors, the change in resistance is smaller than the change in resistance when 60 and 70 wt % of the carbon black is added thereto.

As a result, it may be seen that when the sensor is produced to contain 70 wt % of carbon black as the conductive particles, the stability and conductivity of the sensor, that is, the stability and sensitivity of the sensor are excellent at the same time.

EXPERIMENTAL EXAMPLE 7

Performance Evaluation of Sensor Based on Dispersant

In Present example of the present disclosure, P3HT was used as a dispersant. The weight percentages (wt %) of P3HT added to the fiber composites were different. Strain sensors were produced using the produced fiber composites. Then, the performance of the sensor according to Experimental Example 3 according to the present disclosure was performed by analyzing a relative resistance when the 300% strain was applied to the produced strain sensors which in turn were returned to an original state thereof. The result is shown in FIG. 19.

Referring to FIG. 19, a sensor (red) containing 5 wt % of P3HT shows the best recovery ability. Therefore, when using the P3HT as a dispersant, it may be desirable to produce the sensor by adding 3 to 7 wt % of the P3HT thereto. More preferably, the sensor may be produced by adding 5 wt % of P3HT thereto. In this case, the sensor as produced may have the best performance.

EXPERIMENTAL EXAMPLE 8

Application of Strain Sensor

A strain sensor using a fiber composite as produced according to the Present Example 1 of the present disclosure is attached to a human arm. Then, a pulse of a human subject was measured by connecting the sensor to an analysis device. The result is shown in FIG. 20.

Referring to FIG. 20, the strain sensor can sensitively sense a pulse of a patient having "hypotension", "normal pressure" and "hypertension". Thus, it may be expected that the strain sensor may be used in medical applications.

Although the present disclosure has been described with reference to the drawings and embodiments as exemplified above, the present disclosure is not limited to the embodiments and the drawings disclosed herein. It is obvious that various modifications may be made thereto by a person skilled in the art within the scope of the present disclosure. In addition, it should be appreciated that effects to be achieved from configurations of the present disclosure as not expressly mentioned may be acknowledged.

What is claimed is:

1. A fiber composite for a strain sensor, the fiber composite comprising:
   a stretchable fiber;
   a conductive elastic polymer layer coated on the stretchable fiber; and
   polymer beads disposed on the conductive elastic polymer layer,
   wherein the polymer beads are also coated with the conductive elastic polymer layer to allow the polymer beads not to be separated from the conductive elastic polymer layer in response to a strain being applied to the fiber composite, and
   wherein the polymer beads are polydimethylsiloxane (PDMS) present in an amount of 5-10% by weight.

2. The fiber composite of claim 1, wherein the conductive elastic polymer layer includes an elastic polymer and conductive particles dispersed in the elastic polymer, and
   wherein the fiber composite contains carbon black in a range of 65% to 75% by weight.

3. The fiber composite of claim 2, wherein the fiber composite contains 70% of carbon black by weight.

4. The fiber composite of claim 2, wherein the elastic polymer is at least one selected from the group consisting of natural rubber, nitrile rubber, acrylonitrile-butadiene rubber, styrenebutadiene rubber, chloroprene rubber, butyl rubber, isoprene-isobutylene rubber, ethylene propylene rubber, chlorosulphonated polyethylene rubber, acrylic rubber, fluoro rubber, polysulfide rubber, silicone rubber, butadiene rubber, isoprene rubber, urethane rubber, polyurethane, polydimethylsiloxane (PDMS), polyolefin thermoplastic elastomer (TPE), polystyrene TPE, polyvinyl chloride TPE, polyester TPE, polyurethane TPE, and polyamide TPE.

5. The fiber composite of claim 2, wherein the elastic polymer is polyurethane.

6. The fiber composite of claim 1, wherein each of the polymer beads has a diameter between 100 μm and 200 μm.

7. The fiber composite of claim 1, wherein the polymer beads are cured polymer beads.

8. The fiber composite of claim 1, wherein the stretchable fiber includes a spandex coated with polyvinyl alcohol (PVA).

9. The fiber composite of claim 1, wherein the stretchable fiber is coated with polyvinyl alcohol (PVA), and
   wherein the conductive elastic polymer layer contains polyurethane and has carbon black particles dispersed therein.

* * * * *